Nov. 9, 1948.   R. L. BENSON   2,453,297
COMPRESSOR MOTOR AND METHOD OF MAKING SAME
Filed April 11, 1942   2 Sheets-Sheet 1
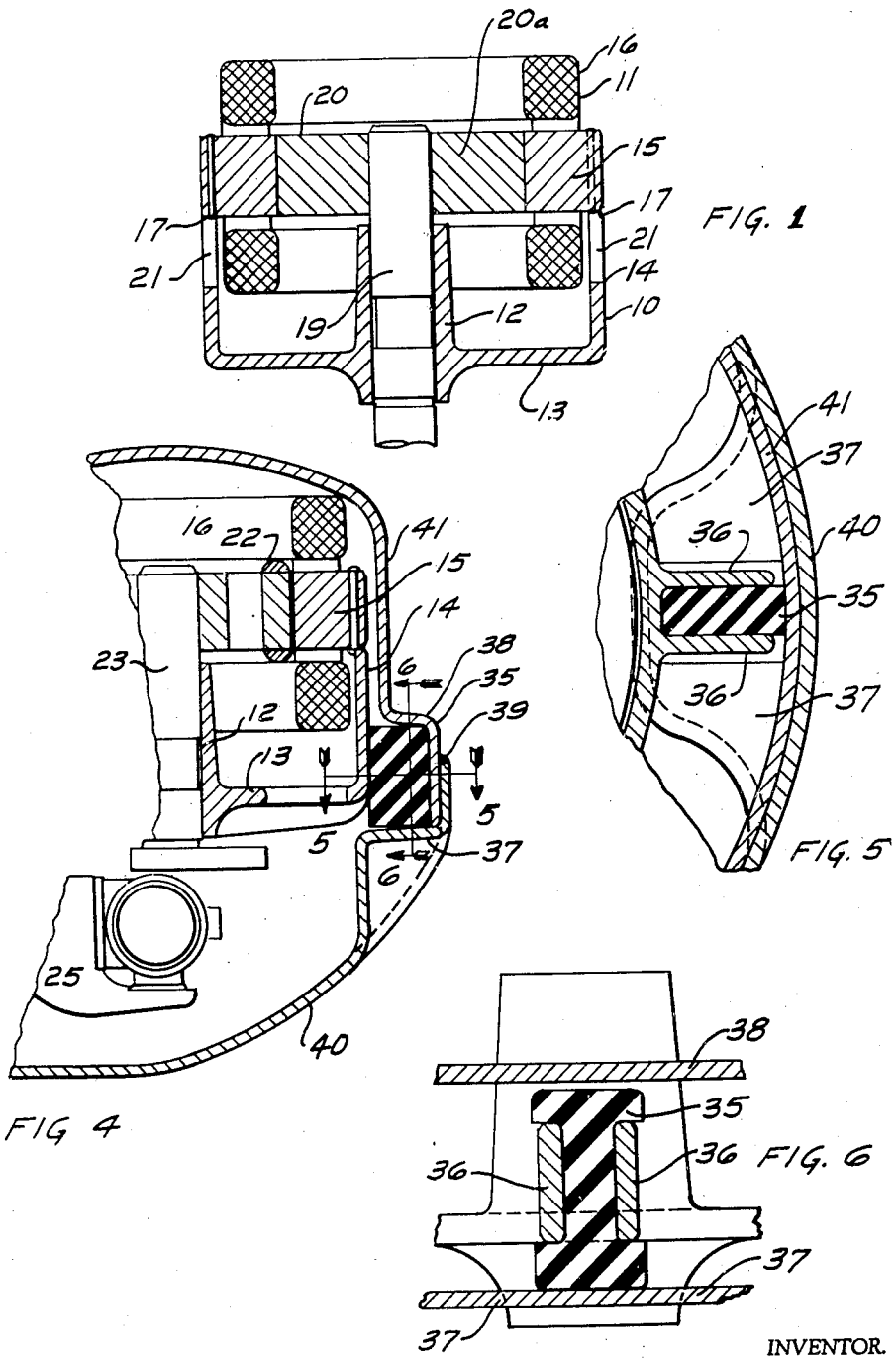
INVENTOR.
RALPH L. BENSON
BY Carroll R. Taber

INVENTOR.
RALPH L. BENSON

Patented Nov. 9, 1948

2,453,297

UNITED STATES PATENT OFFICE 2,453,297

COMPRESSOR MOTOR AND METHOD OF MAKING SAME

Ralph L. Benson, Greenville, Mich., assignor, by mesne assignments, to Gibson Refrigerator Company, Greenville, Mich., a corporation of Michigan Application April 11, 1942, Serial No. 438,547

3 Claims. (Cl. 172—36)

This invention relates to electric motors, and more particularly to a novel motor and frame assembly of a character suitable for use with refrigerant compressors of the sealed or hermetic type.

Previous practices in the manufacture of motors for refrigerant compressors have necessitated holding a large number of dimensions within very close limits, ordinarily about .002 of an inch or less. That has been necessary because of the manner in which the rotor, stator, and rotor journal bearing have been located with respect to each other. For instance, if the stator is bolted to the motor frame it is necessary to accurately locate bolt holes in the stator core and the motor frame so that the radially inner surface of the stator core will be concentric with the axis of the journal bearing and rotor. On the other hand, if the stator is press fitted into the frame, the inside of the frame and the outside of the stator core must be machined very accurately. All of this has been very costly, both from the standpoint of number and accuracy of operations employed in the mass production manufacture of the motor, as well as the quantity of metal needed in the frame.

Accordingly, the principal object of this invention is to provide a motor of novel construction which permits substantial simplification of the method of manufacture without loss of accuracy of alignment of the rotor and stator.

Another object is the provision of a novel method of assembling the stator and the frame of the motor.

A further object is the provision of a motor and frame assembly in which a frame of minimum size is employed.

Other objects of the invention will appear in the following specification, when read in connection with the accompanying drawings, wherein—

Figure 1 is an axial cross-sectional view of the motor frame, stator and dummy rotor for locating the stator relative to the frame;

Figure 4 is a fragmentary cross-sectional view of a modified form of the invention;

Figure 5 is a fragmentary cross-sectional view taken on substantially the line 5—5 of Figure 4; and Figure 6 is a fragmentary cross-sectional view taken on substantially the line 6—6 of Figure 4.

Figure 3:
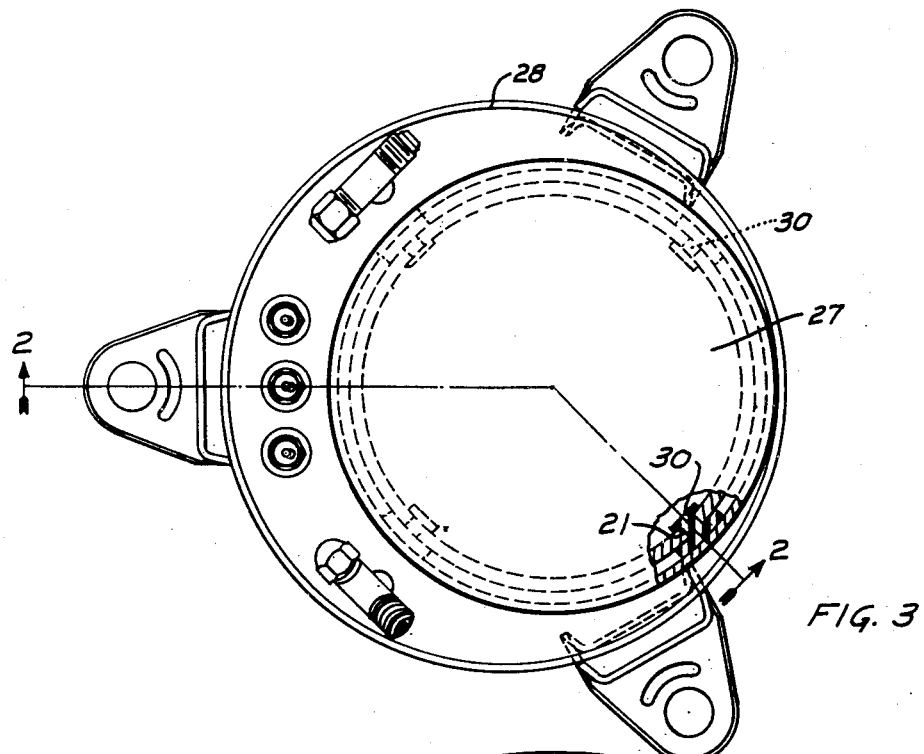
Figure 3 is a plan view of the compressor, a portion being broken away to show the construction thereof.

Referring now to the drawings in more detail, Figure 1 illustrates a frame member 10 and the stator 11 of a motor in which the invention is embodied. Preferably the frame is a one piece casting. Centrally of the frame and extending axially thereof is a journal bearing 12 to receive the journal of a rotor. The interior of the journal bearing 12 is accurately bored. Extending radially outwardly from the journal bearing is a spider 13. At the outer periphery of the spider, and extending axially of the frame, is a cylindrical side wall 14. Equidistantly spaced about the free extremity of the side walls are four rectangular notches 21.

The stator 11 consists of a laminated iron core 15 and the usual field coils 16 wound thereon. The inner surface of the core 15 is finished to cylindrical form of predetermined diameter. This surface must be located exactly concentric with the axis of the journal bearing. According to the present invention, this is accomplished by mounting the stator 11 upon the wall 14 of frame 10, accurately centering the inner surface of the core 15 with respect to the bearing 12, and permanently securing the stator to the frame while those parts are so centered. To that end, the frame 10 and the stator 11 are assembled with a dummy rotor 20, as shown in Figure 1. The dummy rotor includes a shaft 19 and a head 20a. The shaft and head are formed of predetermined dimensions and spacing relative to each other so that when the shaft is disposed in the bearing 12 the head fits snugly within the stator 11 and accurately positions and centers the interior of the stator core 15 with respect to the axis of the bearing 12. While the stator and frame are held in this position by the dummy rotor, the core 15 is permanently secured to the adjacent edge of the cylindrical wall 14 of frame 10. It will be understood that in assembling the stator and frame upon the dummy 20, the shaft 19 is first inserted in bearing 12 and the stator 11 is then slipped over the head 20a—the clearance between the latter parts being just sufficient to permit sliding the stator onto the head 20a.

Preferably, and as here shown, the core 15 is arc welded to the wall 14 at a plurality of spaced points indicated by the reference numeral 17. Inasmuch as the stresses on the connection between the stator and frame are relatively small, the two parts need be welded only at a limited number of points.

Prior to securing the stator 11 to the frame 10 as just described, a rubber block 30 is inserted in each of the notches 21 in the free edge of wall 14. These blocks are of H shape in section (see Figure 3) having a portion disposed on the inside of wall 14 and a portion disposed on the outside of the wall. The blocks are preferably of a height corresponding to the depth of the cooperating recess 21. Thus, when the stator 11 is welded to the wall 14 of frame 10, the blocks are locked in position. The purpose of the blocks will be made clear presently.

After the stator has been secured to the frame 10, the dummy rotor 20 is removed and becomes available for use in assembling another frame and stator. When the dummy rotor 20 is removed, a true rotor 22 of conventional form is installed in its place. Rotor 22 includes a shaft 23 having a portion positioned in the bearing 12 of frame 10.

The true rotor is of a smaller diameter than the head 20a of dummy rotor 20. Preferably, the difference in diameter is approximately .02 inch. Thus, there is provided an air gap between the rotor and the stator core of approximately .01 inch. Inasmuch as an air gap is essential, it will be readily understood why the dummy rotor 20 is employed during the assembling operation instead of using the true rotor 22 for that purpose. Likewise, inasmuch as it is very essential that the air gap be of substantially uniform width throughout its circumference, it will be understood that the interior cylindrical surface of the core 15 of stator 11 must be very accurately centered relative to bearing 12. That is to say, the interior of core 15 must be concentric with the axis of bearing 12.

The above process of assembling the stator and motor frame eliminates the necessity for machining the interior periphery of the motor frame and the external periphery of the stator or for drilling or tapping bolt holes. Inasmuch as the stator is attached to an axial extremity of the side wall of the frame, there is no necessity of extending the frame side wall axially to surround the outside of the stator core—thus effecting a substantial saving of material in the frame.

Figure 2:
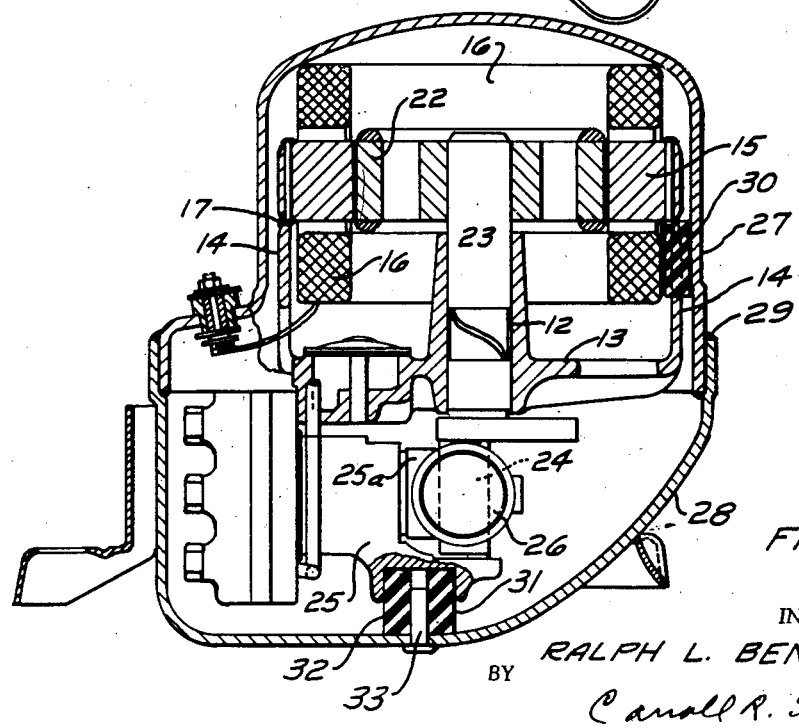
Figure 2 is a cross-sectional view of a compressor embodying the invention, taken on substantially the line 2—2 of Figure 3.

As shown in Figure 2, a pump or compressor 25 of conventional form is mounted on and positioned below the frame 10. Pump 25 is of the reciprocating piston type including a piston 25a connected to a cross head 26. Cross head 26 is connected to a crank pin 24 secured to the lower extremity of rotor shaft 23. Piston 25a is reciprocated horizontally in response to rotation of shaft 23.

The motor-compressor unit, comprising the motor and pump, is housed within a steel shell. The shell is composed of an upper part 27 and a lower part 28 which are welded together after the compressor unit is located in the shell. The internal diameter of the part 27 is but slightly greater than the external diameter of the motor compressor unit. The clearance is slightly less than the exposed thickness of the rubber blocks 30. The compressor unit is pressed into the upper part 27 of the steel shell. The radially outer parts of the blocks 30 are thereby put under a slight compressive force. Another rubber block 31, which is an annular ring, is mounted in the lower part 28 of the steel shell and is held thereon by means of a pin 33 inserted into the hole in the block 31. The upper end of the block 31 seats in a recess 32 in the bottom of the pump casing. After the parts are all secured together as above described, the two parts 27 and 28 of the steel shell are welded together to provide a hermetically sealed housing for the compressor unit.

Since the rubber blocks 30 and 31 are exposed to the refrigerant and lubricating oil they must be of suitable composition to retain their resiliency and resist deterioration. Various synthetic rubbers have the desired properties.

From the foregoing it will be seen that the motor-compressor unit is supported in the housing solely by means of the rubber blocks above described. The blocks 30 provide radial support for the compressor unit, and the block 31 provides axial support for the unit. Sound waves do not readily travel through rubber. Hence, any noise created by the operation of the compressor unit will not be transmitted to the shell. Consequently, the shell does not act as a sounding board to amplify the noise of operation of the compressor.

A modified form of support for the motor-compressor unit is disclosed in Figures 4 to 6. In this modification the unit is suspended from the steel shell by means of four rubber blocks 35 circumferentially spaced about the motor frame. These blocks furnish both axial and radial support for the unit.

Instead of being notched as in the previously described modification, the motor frame is provided with four equi-distantly spaced pairs of radially extending integral lugs 36. The rubber blocks 35 which are I-shaped in cross-section are mounted between the lugs of each pair so that the rubber extends over the top and bottom edges of the lugs (see Figure 6). The radial width of the blocks 35 is somewhat greater than the radial width of the lugs 36 (see Figure 5).

The lower part 40 of the steel shell is indented inwardly at four spaced points to provide a plurality of seats 37 upon which the blocks 35 rest. The upper part 41 of the steel shell is pressed outwardly at its lower periphery to provide an annular rabbet 38. This rabbet 38 receives the upper ends of the blocks 35. The diameter of the rabbet 38 is slightly less than the distance between radially opposite surfaces of two opposite blocks so that when the motor frame and the rubber blocks are placed therein, as indicated in Figure 4, the rubber blocks 35 are compressed radially.

The two halves of the shell are assembled together as shown in Figure 4, so that the rubber blocks are held between the seats 37 and the horizontal wall of the rabbet 38. The two halves of the shell are welded together at 39 to hermetically seal the shell.

It will be seen from the foregoing that the mounting shown in Figures 4 to 6 provides axial support for the motor-compressor unit because the frame lugs 36 rest upon the rubber blocks 35, which in turn are seated on the seats 37. The radially outer edges of the rubber blocks press against the vertical wall of the rabbet 38 and thereby provide radial support for the motor.

Inasmuch as the details of the construction and operation of the compressor 25 form no part of the present invention, they have been omitted herein. Those skilled in the art are familiar with such details and will fully understand and appreciate the improvements which have been described as merely illustrating a typical embodiment of the present invention.

As used in the claims in connection with the stator core 15 the expression "annular inner surface" is intended to describe the usual laminated or slotted construction or any equivalent thereof which surrounds and cooperates with the rotor to define an air gap, and is not intended to necessarily define or imply annular continuity. Likewise, as used in the claims, the expression "journal bearing" is intended to define the structure illustrated by reference numeral 12 in the drawings or any equivalent bearing structure or support therefor.

The scope of the invention is indicated in the appended claims.

I claim:

1. The method of manufacturing motors which comprises providing a frame having a journal bearing with an accurately dimensioned inner surface, providing a stator having a metallic core with an accurately dimensioned annular inner surface, positioning said parts with an external surface of the stator in juxtaposed relation to an external surface of the frame throughout a substantial portion of the perimeters of said parts, arranging and maintaining said parts with the annular inner surface of the core in coaxial relation to the inner surface of the journal bearing solely by accurately dimensioned gauge means engaging said inner surfaces, fixedly connecting said external surface of the stator to said external surface of the frame while holding said parts in said juxtaposed relation and while the said inner surfaces of the journal bearing and the core are maintained in coaxial relation by said gauge means, and thereafter removing at least that portion of the gauge means engaging the inner surface of the core.

2. The method of manufacturing motors which comprises providing a frame having a journal bearing with an accurately dimensioned inner surface portion, providing a stator having an accurately dimensioned annular inner surface portion, positioning said parts with an external surface of the stator in juxtaposed relation to an external surface of the frame, arranging and maintaining said parts with the said annular inner surface portion of the stator in coaxial relation to the said inner surface portion of the journal bearing solely by accurately dimensioned gauge means engaging said inner surface portions, fixedly connecting said external surface of the stator to said external surface of the frame while holding said parts in said juxtaposed relation and while the said inner surface portions of the journal bearing and the stator are maintained in coaxial relation by said gauge means, and thereafter removing at least that portion of the gauge means engaging the inner surface portion of the stator.

3. The method of manufacturing motors which comprises providing a frame having a journal bearing therein and an accurately dimensioned surface portion coaxial with said journal bearing, providing a stator having an accurately dimensioned annular inner surface portion, positioning said stator and frame with an external surface of the former in juxtaposed relation to an external surface of the latter, arranging and maintaining said parts with the said annular inner surface portion of the stator in coaxial relation with the journal bearing solely by accurately dimensioned gauge means engaging said accurately dimensioned surface portions, fixedly connecting said external surface of the stator to said external surface of the frame while holding said parts in said juxtaposed relation and while the said inner surface portion of the stator is maintained in coaxial relation with the journal bearing by said gauge means, and thereafter removing at least that portion of the gauge means engaging the said inner surface portion of the stator.

RALPH L. BENSON.

REFERENCES CITED

The following references are of record in the file of this patent:

UNITED STATES PATENTS

| Number | Name | Date |
|---|---|---|
| 677,909 | Wood | July 9, 1901 |
| 1,527,162 | Alvord | Feb. 24, 1925 |
| 1,822,096 | Hollander | Sept. 8, 1931 |
| 1,934,482 | Bixler | Nov. 7, 1933 |
| 1,967,033 | Lipman | July 17, 1934 |
| 2,236,956 | VonDerHeem | Jan. 1, 1941 |